(12) United States Patent
Wang et al.

(10) Patent No.: US 10,819,398 B2
(45) Date of Patent: Oct. 27, 2020

(54) MULTI INPUT MULTI OUTPUT ANTENNA DEVICE OF TERMINAL AND METHOD FOR REALIZING ANTENNA SIGNAL TRANSMISSION

(71) Applicant: ZTE CORPORATION, Shenzhen, Guangdong (CN)

(72) Inventors: Xiaoming Wang, Guangdong (CN); Chuangzhu Zhou, Guangdong (CN); Zibin Weng, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/753,891

(22) PCT Filed: Oct. 15, 2018

(86) PCT No.: PCT/CN2018/110224
§ 371 (c)(1),
(2) Date: Apr. 6, 2020

(87) PCT Pub. No.: WO2019/076260
PCT Pub. Date: Apr. 25, 2019

(65) Prior Publication Data
US 2020/0259530 A1   Aug. 13, 2020

(30) Foreign Application Priority Data
Oct. 17, 2017   (CN) .......................... 2017 1 0965699

(51) Int. Cl.
*H04B 7/0404*   (2017.01)
*H01Q 1/48*   (2006.01)
(Continued)

(52) U.S. Cl.
CPC ............. *H04B 7/0404* (2013.01); *H01Q 1/48* (2013.01); *H01Q 5/35* (2015.01); *H01Q 7/00* (2013.01);
(Continued)

(58) Field of Classification Search
CPC ...... H04B 7/0404; H04B 7/0413; H01Q 1/38; H01Q 1/48; H01Q 21/30; H01Q 21/0025; H01Q 7/00; H01Q 5/35; H01Q 21/065
See application file for complete search history.

(56) References Cited

U.S. PATENT DOCUMENTS

| | | | |
|---|---|---|---|
| 8,750,798 B2 * | 6/2014 | Rao ........................ | H01Q 21/28 455/41.2 |
| 2011/0018777 A1 * | 1/2011 | Brown ................... | H01Q 21/30 343/788 |

(Continued)

*Primary Examiner* — Thanh C Le (57) ABSTRACT

The present disclosure provides a multi input multi output antenna device including a main board, two end areas of the main board are respectively provided with a group of antenna radiating units, a middle area of the main board is provided with a metal ground unit, wherein a first group of antenna radiating units on one end area of the main board includes a first top-layer radiating subunit and a first bottom-layer radiating subunit, a second group of antenna radiating units on the other end area of the main board includes a second top-layer radiating subunit and a second bottom-layer radiating subunit, and the metal ground unit on the middle area of the main board includes a top-layer metal ground and a bottom-layer metal ground, and a first feeding port and a second feeding port are arranged on the bottom metal ground.

11 Claims, 6 Drawing Sheets

(51) Int. Cl.
    *H01Q 21/00*     (2006.01)
    *H01Q 7/00*     (2006.01)
    *H01Q 5/35*     (2015.01)
    *H01Q 21/06*     (2006.01)
    *H04B 7/0413*     (2017.01)

(52) U.S. Cl.
    CPC ....... *H01Q 21/0025* (2013.01); *H01Q 21/065* (2013.01); *H04B 7/0413* (2013.01)

(56) References Cited

U.S. PATENT DOCUMENTS

2014/0024328 A1*   1/2014   Balbien ................. H04B 7/024
                                                                                                               455/269
2018/0090829 A1*   3/2018   McMichael ............. H01Q 1/48

\* cited by examiner

MULTI INPUT MULTI OUTPUT ANTENNA DEVICE OF TERMINAL AND METHOD FOR REALIZING ANTENNA SIGNAL TRANSMISSION

CROSS REFERENCE TO RELATED APPLICATION

This application is a National Phase Application filed under 35 U.S.C. 371 as a national stage of PCT/CN2018/110224, filed on Oct. 15, 2018, an application claiming the priority of the Chinese patent application No. 201710965699.9, filed on Oct. 17, 2017, the contents of which are incorporated herein by reference in their entirety.

TECHNICAL FIELD

The present disclosure relates to wireless communication technologies, and in particular, to a multiple input multiple output (MIMO) antenna device of a terminal and an antenna signal transmitting method.

BACKGROUND

In wireless communication, MIMO is a key technology. Since a mobile terminal device is generally small in size and spacing between antennas is small, it is difficult to achieve good isolation and low correlation coefficient. Therefore, how to ensure the antennas to have a working state with high performances such as miniaturization, broadband, high degree of isolation and the like in a wireless mobile terminal with a smaller volume is a problem to be solved urgently.

In addition, industrial production has higher requirements on cost, production stability, consistency and precision. Cost of a terminal antenna produced by LDS manner or a bracket manner is relatively high, and although such terminal antenna has certain advantages in space utilization and resistance to interferences between internal devices, in some terminal products, a cost factor occupies a more important position in diversified product competition, and at this time, a low cost advantage of a Printed Circuit Board (PCB) antenna is very important.

SUMMARY

The present disclosure provides a multi input multi output (MIMO) antenna device at least including a main board. Two end areas of the main board are respectively provided with a group of antenna radiating units, and a middle area of the main board is provided with a metal ground unit, where a first group of antenna radiating units on one end area of the main board includes a first top-layer radiating subunit and a first bottom-layer radiating subunit placed in the end area, a second group of antenna radiating units on the other end area of the main board includes a second top-layer radiating subunit and a second bottom-layer radiating subunit placed in the end area, and the metal ground unit on the middle area of the main board includes a top-layer metal ground and a bottom-layer metal ground. A first feeding port and a second feeding port are arranged on the bottom metal ground.

The present disclosure further provides a signal transmitting method performed by the above MIMO antenna device, the method includes: feeding, through two feeding ports of the MIMO antenna device, a radio frequency signal on a main board of a terminal apparatus respectively into a first bottom-layer radiating subunit in a first group of antenna radiating units and a second bottom-layer radiating subunit in a second group of antenna radiating units, so that the first bottom-layer radiating subunit and the second bottom-layer radiating subunit excite working currents, where the working currents are coupled into a first top-layer radiating subunit in the first group of antenna radiating units and a second top-layer radiating subunit in the second group of antenna radiating units.

DETAILED DESCRIPTION

Technical solutions of the present disclosure will be described in further detail with reference to specific embodiments to make objects, the technical solutions and advantages of the present disclosure more apparent. It should be noted that the embodiments of the present application and features of the embodiments may be arbitrarily combined with each other without conflict.

Regarding MIMO technology in wireless communication, Chinese patent No. CN201210107190 discloses an antenna structure supporting LTE MIMO technology of a mobile phone. The MIMO antenna includes a metal ground, a main antenna, and a diversity antenna. The antenna is a high-performance LTE MIMO antenna capable of covering low frequency bands, and is suitable for being placed and installed in a mobile terminal such as a mobile phone. However, the invention has the following disadvantages: firstly, elements of the antenna are all arranged on an antenna bracket, so that a structure of the antenna protrudes out of a dielectric substrate, thus a space occupancy rate of the antenna is increased, height of the antenna is higher, and an integration level of the antenna is low; secondly, the structure of the antenna is high in processing cost, thus competitiveness of the antenna is reduced; and thirdly, a size of the antenna is large, length of a metal wire of the main antenna is ¼ of low-frequency resonance length, and a bandwidth of the diversity antenna is narrow.

In order to realize an LTE antenna with excellent performance, the following methods and structures may be used.

1) A method of using decoupling technology. This technique adds a decoupling network consisting of two transmission lines and several lumped-parameter elements between two antennas. However, this method has several disadvantages: firstly, excessive PCB space is occupied, and the network needs to penetrate through the whole PCB, which is not allowed in an actual design; secondly, the method can only realize good isolation and low correlation in one narrow frequency band, but cannot realize good isolation and low correlation in a plurality of wide frequency bands simultaneously.

2) A method of using a neutral line technique to achieve high isolation between antennas. Specifically, a transmission line is added between two antennas which are very close to each other, and the transmission line can neutralize coupling energy between the antennas, so that high isolation is realized. However, disadvantages of this method are also evident: firstly, high isolation can be realized only in a narrow frequency band; secondly, this method is not suitable for multi-band operation, and high isolation can be realized in the narrow frequency band by adopting the method, but isolation is deteriorated in other frequency bands. Moreover, after the neutral line technology is adopted, the two antennas are still symmetrical, and radiation directions are still very close to each other, so that a problem of the envelope correlation coefficient in a low frequency band may still not be solved.

3) A method of using an electromagnetic metamaterial antenna. In the method, an antenna is fabricated by two kinds of electromagnetic metamaterials, so that a size of the antenna is small. But this method is also difficult to realize multi-band operation, and radiation efficiency of the antenna in a designed frequency band is low.

4) A method of placing diversity antenna by side. Specifically, a main antenna is placed at an end of a long side of a board, and a diversity antenna is placed at a side of the board. Radiation directions of the two antennas are different, so that high isolation and low correlation coefficient between the antennas are realized, and radiation efficiency is good. However, this method requires almost all of side space, and in many cases, mobile phone manufacturers cannot provide such space for the diversity antenna, thus a scope in which this method can be applied is limited.

It can be seen that the above methods and related structures may have various drawbacks or problems.

Figure 1:
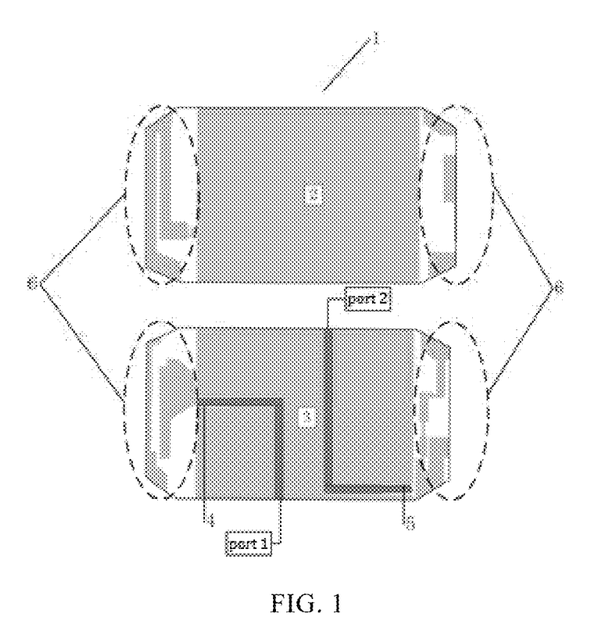
FIG. 1 is a schematic structural diagram of an antenna device of a terminal apparatus according to an embodiment of the present disclosure.
Figure 2:
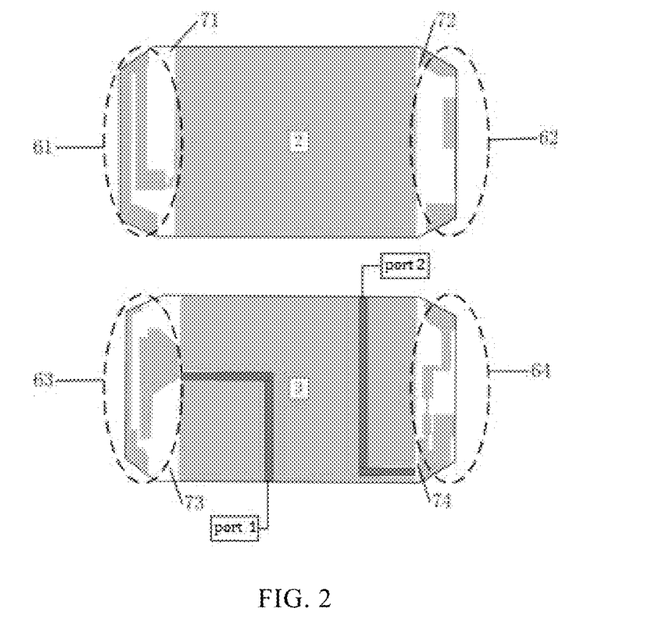
FIG. 2 is a detailed structural schematic diagram of an antenna topology unit of a terminal apparatus according to an embodiment of the present disclosure.

In view of this, an embodiment of the present disclosure provides a MIMO antenna device of a terminal. As shown in FIG. 1, the MIMO antenna device of the terminal includes a main board 1 which is divided into two end areas and a middle area. The middle area is a metal ground unit and is mainly used for conducting circuits. The metal ground unit is divided into a top-layer metal ground 2 and a bottom-layer metal ground 3, and a first feeding port 4 and a second feeding port 5 are arranged on the bottom-layer metal ground 3. The two end areas (also called as two end metal-free areas) of the main board 1 are respectively provided with a group of antenna radiating units 6. A first group of antenna radiating units in one end area includes a first top-layer radiating subunit 61 placed in the end area and a first bottom-layer radiating subunit 63 placed in the end area. A second group of antenna radiating units in the other end area includes a second top-layer radiating subunit 62 placed in the end area and a second bottom-layer radiating subunit 64 placed in the end area, as shown in FIG. 2.

During a transmitting process, a radio frequency signal on the main board 1 of the terminal is fed into the first bottom-layer radiating subunit 63 and the second bottom-layer radiating subunit 64 through the first feeding port 4 and the second feeding port 5, respectively, so that the first bottom-layer radiating subunit 63 and the second bottom-layer radiating subunit 64 excite working currents, and the working currents are coupled into the first top-layer radiating subunit 61 and the second top-layer radiating subunit 62.

In one embodiment, the first top-layer radiating subunit 61 may include a low-frequency radiator 611, a resonant network 612 and a short circuit branch 613, and the first bottom-layer radiating subunit 63 may include a non-frequency-varying monopole sub-radiator 631 and a first radiating patch 632.

That is, the low-frequency radiator 611 in the first top-layer radiating subunit 61 is equivalent to a series resonant circuit, and the resonant network 612 is a parallel resonant circuit. The current passes through the low-frequency radiator 611, enters the resonant network 612, and then flows into the top-layer metal ground 2 through the short circuit branch 613, thereby forming a complete resonant circuit.

In one embodiment, the low-frequency radiator 611 has a U-shaped loop or a ring-like loop and exhibits magnetically coupled radiating characteristics.

The second top-layer radiating subunit 62 includes a second radiating patch 621, a third radiating patch 622 and a fourth radiating patch 623 between which gaps are left, and the second radiating patch 621 is connected to the top-layer metal ground 2 through a first matching network 8.

The second bottom-layer radiating subunit 64 includes a fifth radiating patch 641 and a sixth radiating patch 642. The fifth radiating patch 641 is connected to the sixth radiating patch 642 through a second matching network 9. The fifth radiating patch 641 is connected to the sixth radiating patch 642 to form electric dipole radiating characteristics.

In one embodiment, the first matching network 8 and the second matching network 9 may employ one electrical element, or a combination of multiple same electrical elements connected in series and/or in parallel, or a combination of multiple different electrical elements connected in series and/or in parallel. The electrical elements referred to herein may include inductors and capacitors.

In one embodiment, the top-layer metal ground 2, the first top-layer radiating subunit 61 and the second top-layer radiating subunit 62 may be co-located on one printed circuit layer of the main board 1, and the bottom-layer metal ground 3, the first bottom-layer radiating subunit 63, the second bottom-layer radiating subunit 64, the first feeding port 4 and the second feeding port 5 may be co-located on another printed circuit layer of the main board 1.

In addition, shapes of the antenna radiating units/subunits described above are not limited to shapes shown in the accompany drawings of the present disclosure, and sizes of the radiating patches and sizes of gaps among the radiating patches are not limited to sizes adopted in the embodiments of the present disclosure.

Shapes of metal-free areas may be any regular or irregular shape, and is not limited to shapes shown in the accompany drawings of the present disclosure, and shapes of metal-free areas on a top layer of the main board 1 and shapes of metal-free areas on a bottom layer of the main board 1 do not need to be identical.

The resonant network 612 may include one or more inductors and capacitors.

The present application is not limited to a range of frequency band operated in the embodiments of the present disclosure. Sizes of the antennas may be adjusted according to a requirement to the operating frequency band, so as to meet the requirement to the operating frequency band.

An embodiment of the present disclosure also provides a signal transmitting method performed by a MIMO antenna device of a terminal, which may be implemented by using the above antenna device. The method includes following steps: feeding, through two feeding ports of the MIMO antenna device, a radio frequency signal on a main board of a terminal apparatus respectively into the first bottom-layer radiating subunit 63 in the first group of antenna radiating units and the second bottom-layer radiating subunit 64 in the second group of antenna radiating units, so that the first bottom-layer radiating subunit 63 and the second bottom-layer radiating subunit 64 excite working currents which are coupled into the first top-layer radiating subunit 61 in the first group of antenna radiating units and the second top-layer radiating subunit 62 in the second group of antenna radiating units.

In one embodiment, the coupled working currents also enters the resonant network 612 through the low-frequency radiator 611 in the first top-layer radiating subunit 61 in the first group of antenna radiating units, and then flows into the top-layer metal ground 2 through the short circuit branch 613, thereby forming a complete resonant circuit. In one embodiment, the low-frequency radiator 611 in the first top-layer radiating subunit 61 has a U-shaped loop or a ring-like loop, and exhibits magnetically coupled radiating characteristics.

Since the above method may be implemented based on the above antenna device, specific implementing details of the method may refer to corresponding descriptions of the above antenna device, and are not described herein again.

To further clarify technical means taken by the present disclosure to achieve intended objects and effects, the present disclosure will be described in detail with reference to the accompanying drawings and specific embodiments.

As shown in FIG. 1, an antenna device of a terminal apparatus disclosed herein includes a main board 1, a top-layer metal ground 2, a bottom-layer metal ground 3, a first feeding port 4, a second feeding port 5 and two groups of antenna radiating units 6.

As shown in FIG. 2, the first group of antenna radiating units includes a first top-layer radiating subunit 61 and a first bottom-layer radiating subunit 63, and the second group of antenna radiating units includes a second top-layer radiating subunit 62 and a second bottom-layer radiating subunit 64.

Figure 3A:
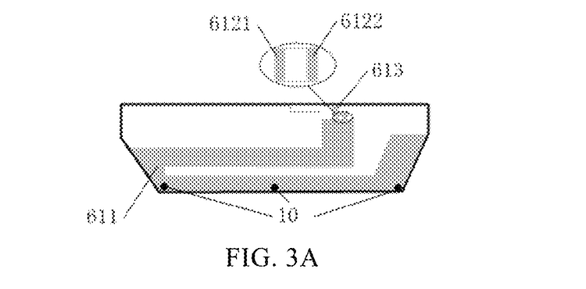
FIG. 3A is a detailed structural schematic diagram of a top-layer of a main antenna of a terminal apparatus according to an embodiment of the disclosure.
Figure 3B:
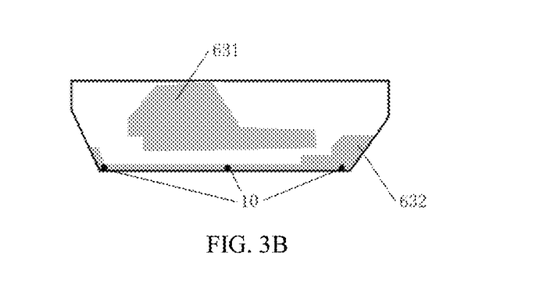
FIG. 3B is a detailed structural diagram of a bottom-layer of a main antenna of a terminal apparatus according to an embodiment of the disclosure.

As shown in FIG. 3A, the first top-layer radiating subunit 61 includes a low-frequency radiator 611, a resonant network 612 and a short circuit branch 613. As shown in FIG. 3B, the first bottom-layer radiating subunit 63 includes a non-frequency-varying monopole sub-radiator 631 and a first radiating patch 632. In one embodiment, the low-frequency radiator 611 has a U-shaped loop or a ring-like loop and exhibits magnetically coupled radiating characteristics.

Figure 4A:
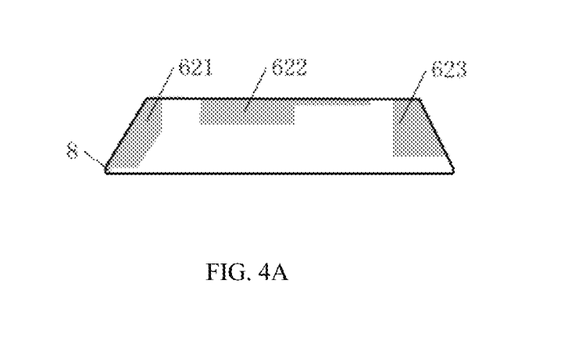
FIG. 4A is a detailed structural schematic diagram of a top-layer of a diversity antenna of a terminal apparatus according to an embodiment of the present disclosure.
Figure 4B:
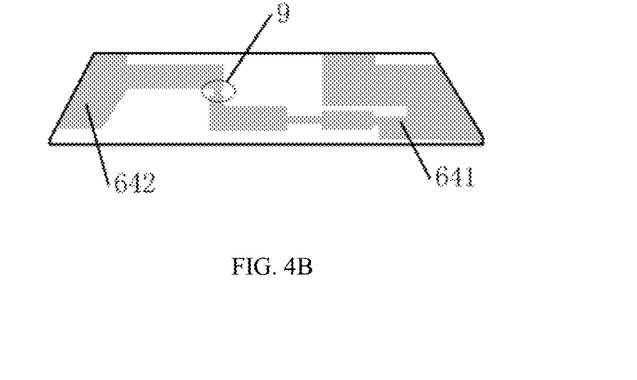
FIG. 4B is a detailed structural diagram of a bottom-layer of a diversity antenna of a terminal apparatus according to an embodiment of the disclosure.

As shown in FIG. 4A, the second top-layer radiating subunit 62 includes a second radiating patch 621, a third radiating patch 622, and a fourth radiating patch 623. As shown in FIG. 4B, the second bottom-layer radiating subunit 64 includes a fifth radiating patch 641 and a sixth radiating patch 642.

In one embodiment, the top-layer metal ground 2, the first top-layer radiating subunit 61 and the second top-layer radiating subunit 62 are located on a same printed circuit layer of the main board 1; the bottom-layer metal ground 3, the first bottom-layer radiating subunit 63, the second bottom-layer radiating subunit 64, the first feeding port 4 and the second feeding port 5 are located on another printed circuit layer of the main board 1.

In one implementation, two ends of the main board 1 are metal-free areas, a first metal-free area 71 (referring to FIG. 2) includes an area where the first top-layer radiating subunit 61 is located, a second metal-free area 72 (referring to FIG. 2) includes an area where the second top-layer radiating subunit 62 is located, a third metal-free area 73 (referring to FIG. 2) includes an area where the first bottom-layer radiating subunit 63 is located, and a fourth metal-free area 74 (referring to FIG. 2) includes an area where the second bottom-layer radiating subunit 64 is located.

FIG. 3A is a schematic view of the first metal-free area 71 of the antenna device according to an embodiment of the present disclosure. FIG. 4A is a schematic diagram of the second metal-free area 72 of the antenna device according to an embodiment of the present disclosure. In an embodiment of the present disclosure, the first top-layer radiating subunit 61 and the second top-layer radiating subunit 62 are respectively located in the first metal-free area 71 and the second metal-free area 72 located at two ends of a top layer of the main board 1. Shapes of the first metal-free area 71 and the second metal-free area 72 may be any regular or irregular shape and is not limited to shapes adopted in the embodiments of the present disclosure. FIG. 3B is a schematic diagram of the third metal-free area 73 of the antenna device according to an embodiment of the present disclosure. FIG. 4B is a schematic diagram of a fourth metal-free area 74 of the antenna device according to the embodiment of the present disclosure. The first bottom-layer radiating subunit 63 and the second bottom-layer radiating subunit 64 are respectively located in the third metal-free area 73 and the fourth metal-free area 74 located at two ends of a bottom layer of the main board 1. Shapes of the third metal-free area 73 and the fourth metal-free area 74 may be any regular or irregular shape and is not limited to shapes adopted in the embodiments of the present disclosure. The shapes of first metal-free area 71 and third metal-free area 73 do not need be identical, and the shapes of second metal-free area 72 and fourth metal area 74 do not need to be identical either.

As shown in FIG. 3A, in an embodiment of the present disclosure, the first top-layer radiating subunit 61 includes the low-frequency radiator 611, the resonant network 612, and the short circuit branch 613. The low-frequency radiator 611 is connected to the short circuit branch 613 through the resonant network 612, and the short circuit branch 613 is connected to a metal ground (i.e., the top-layer metal ground 2) in a same layer. The resonant network 612 may include one or more inductors and capacitors. In an embodiment, the resonant network 612 may be formed by a parallel capacitor 6121 and a parallel inductor 6122. As shown in FIG. 3B, the first bottom-layer radiating subunit 63 includes the non-frequency-varying monopole sub-radiator 631 and the first radiating patch 632 with a gap therebetween. In an embodiment, there are three metallized vias 10 between the low-frequency radiator 611 and the non-frequency-varying monopole sub-radiator 631. In an embodiment, the sub-radiator 631 may be a planar ultra-wideband non-frequency-varying monopole sub-antenna.

Figure 5:
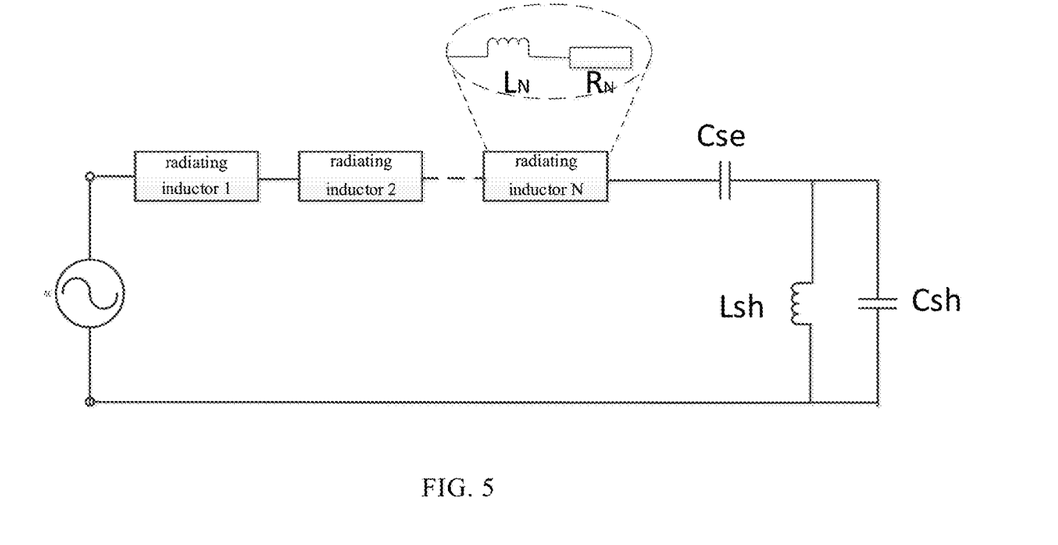
FIG. 5 is an equivalent circuit diagram of a main antenna of a terminal apparatus according to an embodiment of the disclosure.

FIG. 5 is an equivalent circuit diagram of an antenna device of a terminal apparatus according to an embodiment of the present disclosure. As shown in FIG. 5, the low-frequency radiator 611 and the non-frequency-varying monopole sub-radiator 631 are equivalent to a multi radiating inductor series array composed of radiating inductors LN and RN. A gap between the low-frequency radiator 611 and the non-frequency-varying monopole sub-radiator 631 generates a coupling capacitance Cse with the first radiating patch 632. A parallel capacitor 6121 and a parallel inductor 6122 form an equivalent parallel capacitor Csh or an equivalent parallel inductor Lsh. A resonance state of the antenna device may be controlled by only properly adjusting magnitudes of LN, Cse, Lsh and Csh, and a matching bandwidth and radiating efficiency of the antenna device may be properly adjusted by adjusting RN. By optimizing a size of the coupling gap between the low-frequency radiator 611 and the non-frequency-varying monopole sub-radiator 631 of the antenna device, a line width and a line length of the low-frequency radiator 611, and values of the parallel capacitor 6121 and the parallel inductor 6122, resonance characteristics and matching states may be adjusted, and a LTE bandwidth may be completely covered finally.

Figure 6:
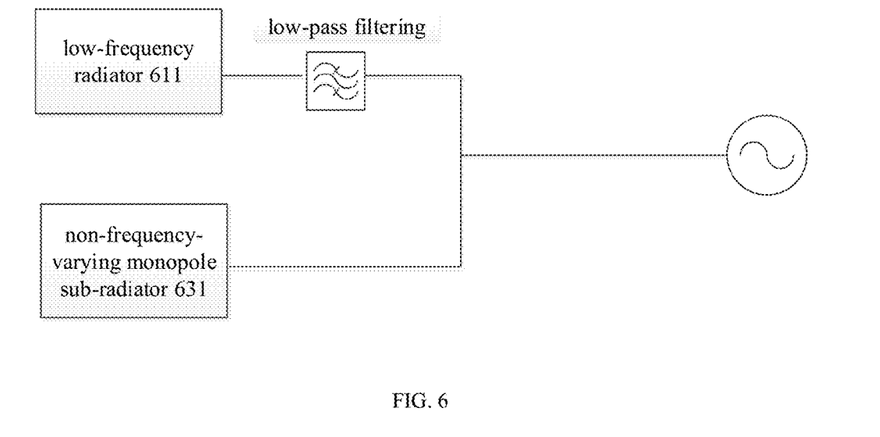
FIG. 6 is a schematic diagram of separately tuning high frequencies and low frequencies in a main antenna of a terminal apparatus according to an embodiment of the present disclosure.

FIG. 6 is an equivalent circuit diagram of an antenna device in which high frequencies and low frequencies are tuned separately according to an embodiment of the disclosure. The low-frequency radiator 611 forms a low-pass filter with the non-frequency-varying monopole sub-radiator 631. Characteristics of the low-pass filtering isolate effects of the high frequencies of LTE, so that the low-frequency radiator 611 may be tuned individually. A filtering frequency band of the low-pass filtering may be adjusted by optimizing the size of the coupling gap of the low-frequency radiator 611 and the non-frequency-varying monopole sub-radiator 631 of the antenna device and the line length and the line width of the low-frequency radiator 611. By optimizing a size of the non-frequency-varying monopole sub-radiator 631 and adjusting impedance matching of the feeding ports, the LTE bandwidth may be completely covered finally.

As shown in FIG. 4A, the second top-layer radiation subunit 62 includes a second radiating patch 621, a third radiating patch 622 and a fourth radiating patch 623 between which gaps are left, and the second radiating patch 621 is connected to a metal ground (i.e., the top-layer metal ground 2) in a same layer through a first matching network 8. The first matching network 8 may include one or more inductors and capacitors. In an embodiment of the present disclosure, the first matching network 8 is formed by one inductor. As shown in FIG. 4B, the second bottom-layer radiating subunit 64 includes a fifth radiating patch 641 and a sixth radiating patch 642, where the fifth radiating patch 641 is connected to the sixth radiating patch 642 through a second matching network 9. The fifth radiating patch 641 and the sixth radiating patch 642 are connected to with each other and have electric dipole characteristics. The second matching network 9 may include one or more inductors and capacitors. In an embodiment of the present disclosure, the second matching network 9 is formed by one inductor.

Based on the above-described antenna device of the terminal apparatus according to the present disclosure, during a transmitting process, a radio frequency signal on main board 1 of the terminal apparatus is respectively fed into the first bottom-layer radiating subunit 63 and the second bottom-layer radiating subunit 64 through the first feeding port 4 and the second feeding port 5, so that the first bottom-layer radiating subunit 63 and the second bottom-layer radiating subunit 64 excite working currents, and the working currents are coupled into the first top-layer radiating subunit 61 and the second top-layer radiating subunit 62. The low-frequency radiator 611 in the first top-layer radiating subunit 61 is equivalent to a series resonant circuit, the resonant network 612 is a parallel resonant circuit, and the currents enters the resonant network 612 through the low-frequency radiator 611, and then flows into the top-layer metal ground 2 through the short circuit branch 613, thereby forming a complete resonant matching circuit.

By optimizing a shape and a size of the low-frequency radiator 611 in the antenna device, a shape and a size of the short circuit branch 613 in the antenna device, a shape and a size of the non-frequency-varying monopole sub-radiator 631 in the antenna device, a shape and a size of each radiating patch, the resonant network 612 and positions and values of the two matching networks, resonant states and matching states of the antenna device may be adjusted, and finally a target bandwidth may be completely covered.

One application of the antenna device according to an embodiment of the present disclosure is described below.

For example, an embodiment of the present disclosure may be applied to a main board of a terminal. A main antenna (i.e. the above-described first group of antenna radiating units including the first top-layer radiating sub-unit 61 and the second top-layer radiating sub-unit 62) has a size of $0.04\lambda \times 0.12\lambda$ ($\lambda$ is a wavelength of a lowest frequency), a diversity antenna has a size of $0.025\lambda \times 0.12\lambda$, and thickness of the main board may be 1 mm.

Figure 7:
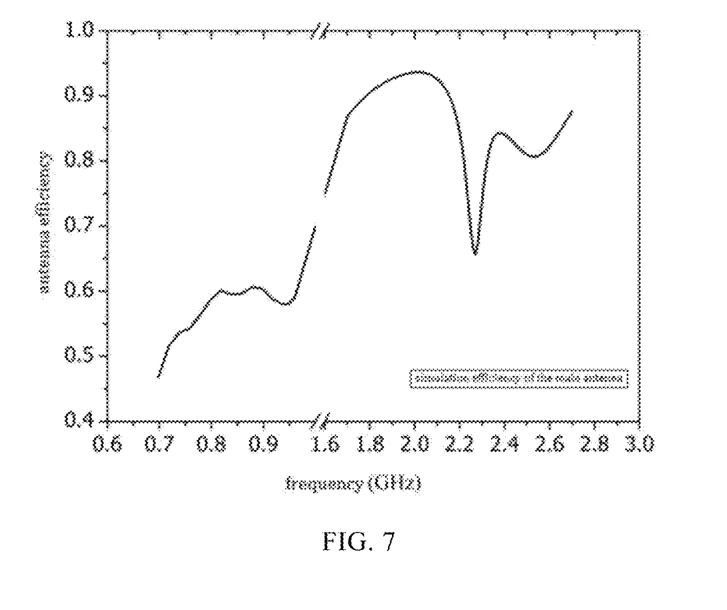
FIG. 7 is a diagram of a radiation efficiency of a main antenna of a terminal apparatus according to the present disclosure.

FIG. 7 is a radiating efficiency diagram of a simulated radiation of a main antenna (i.e., the above-described first group of antenna radiating units) according to an embodiment of the disclosure. As shown in FIG. 7, the radiating efficiency of the main antenna is more than 40% at low frequencies and more than 60% at high frequencies. It can be seen that the antenna device of the terminal covers required LTE frequency bands of 698 MHz to 960 MHz and 1710 MHz to 2690 MHz. Therefore, the antenna according to an embodiment of the present disclosure has a characteristic of high efficiency, and may meet a requirement to high performance of the antenna.

Figure 8:
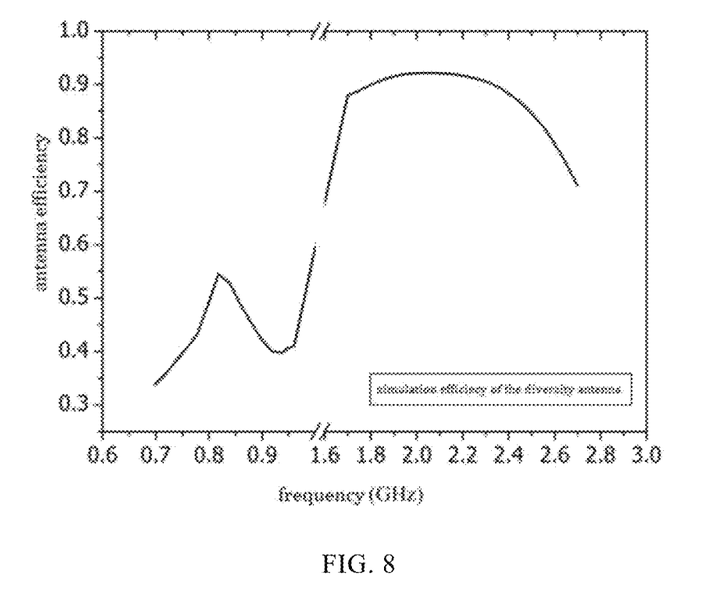
FIG. 8 is a diagram of a radiation efficiency of a diversity antenna of a terminal apparatus according to the present disclosure.

FIG. 8 is a radiating efficiency diagram of a simulated radiation of a diversity antenna (i.e., the above-described second group of antenna radiating units) according to an embodiment of the present disclosure. In the present disclosure, the diversity antenna may also be referred to as a secondary antenna. As shown in FIG. 8, the radiating efficiency of the secondary antenna is greater than 30% at low frequencies and greater than 70% at high frequencies. The antenna covers the required LTE frequency bands of 698 MHz to 960 MHz and 1710 MHz to 2690 MHz. Therefore, the antenna has the characteristic of high efficiency, and may meet the requirement to high performance of the antenna.

Figure 9:
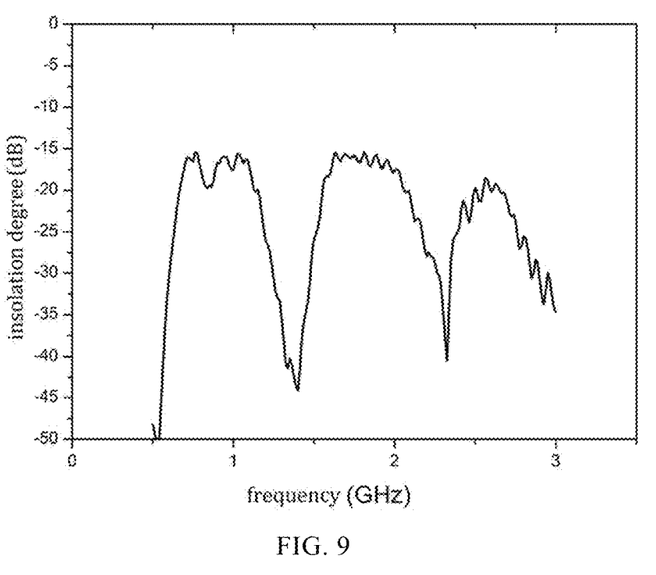
FIG. 9 is a diagram of an isolation degree between a main antenna and a diversity antenna of a terminal apparatus according to the present disclosure.

FIG. 9 shows an insolation degree between two ports (i.e., the feeding port 4 and the feeding port 5) according to an embodiment of the disclosure. As shown in FIG. 9, the isolation degree between the two ports is greater than 15 dB over a full frequency band.

As can be seen from the above embodiments, the present disclosure may have, for example, the following effects.

Firstly, the high-frequency and low-frequency radiating main bodies are separated, broadband of high-frequency of a main antenna is realized by adopting a planar ultra-wideband non-frequency-varying monopole sub-antenna (631 shown in FIG. 3B), miniaturization and high efficiency of low-frequency of the main antenna is realized by adopting a radiating inductor (611 shown in FIG. 3A), connection between the high-frequency and the low-frequency is realized by adopting a low-pass LC series resonance loop, and the low frequency is passed and the high frequency is resisted at the connection, so that a ultra-wideband characteristic of the high-frequency is not influenced when a low-frequency resonance bandwidth is adjusted, and flexible adjustments may be flexibly adjusted according to different requirements and different models.

Secondly, the main antenna (i.e., the first group of antenna radiating units) adopts annular magnetic dipole radiation, the diversity antenna (i.e., the second group of antenna radiating units) adopts a monopole electric dipole radiation, the main antenna and the diversity antenna adopt different modes, and the two antenna elements are respectively arranged at two ends of a medium substrate, so that isolation is improved.

Furthermore, the antenna according to an embodiment of the present disclosure is a planar antenna structure directly printed on a substrate, which reduces a volume, simplifies processes, and reduces costs.

It will be understood by those skilled in the art that all or part of the steps of the above methods may be implemented by a program instructing relevant hardware, and the program may be stored in a computer-readable storage medium, such as a read-only memory, a magnetic or optical disk, and the like. Optionally, all or part of the steps of the above embodiments may be implemented by using one or more integrated circuits. Accordingly, each module/unit in the above embodiments may be implemented in a form of hardware, and may also be implemented in a form of a software functional module. The present application is not limited to any specific form of combination of hardware and software.

The above description is only an illustrative example of the present disclosure, and is not intended to limit the scope of the present disclosure. Any modification, equivalent replacement, improvement or the like made within the spirit and principle of the present disclosure should be included in the protection scope of the present disclosure.

What is claimed is:

1. A multi input multi output (MIMO) antenna device of a terminal, comprising:
    a main board, two end areas of the main board being respectively provided with a group of antenna radiating units, a middle area of the main board being provided with a metal ground unit,
    wherein a first group of antenna radiating units on one end area of the main board comprises a first top-layer radiating subunit and a first bottom-layer radiating subunit placed in the end area,
    a second group of antenna radiating units on the other end area of the main board comprises a second top-layer radiating subunit and a second bottom-layer radiating subunit placed in the end area, and
    the metal ground unit on the middle area of the main board comprises a top-layer metal ground and a bottom-layer metal ground, and a first feeding port and a second feeding port are arranged on the bottom metal ground.

2. The antenna device of claim 1, wherein
    a radio-frequency signal on the main board is respectively fed into the first bottom-layer radiating subunit and the second bottom-layer radiating subunit through the first feeding port and the second feeding port on the bottom-layer metal ground, so that the first bottom-layer radiating subunit and the second bottom-layer radiating subunit excite working currents, and the working currents are coupled into the first top-layer radiating subunit and the second top-layer radiating subunit.

3. The antenna device of claim 1,
    the first top-layer radiating subunit comprises a low-frequency radiator, a resonant network and a short circuit branch, and
    the first bottom-layer radiation subunit comprises a non-frequency-varying monopole sub-radiator and a first radiating patch.

4. The antenna device of claim 3,
    the low-frequency radiator has a U-shaped loop or a ring-like loop and has magnetically coupled radiating characteristics.

5. The antenna device of claim 1,
    the second top-layer radiating subunit comprises a second radiating patch, a third radiating patch and a fourth radiating patch, wherein gaps are reserved among the second radiating patch, the third radiating patch and the fourth radiating patch, and the second radiating patch is connected with the top-layer metal ground through a first matching network.

6. The antenna device of claim 1,
    the second bottom-layer radiating subunit comprises a fifth radiating patch and a sixth radiating patch, wherein the fifth radiating patch is connected with the sixth radiating patch through a second matching network.

7. The antenna device of claim 6,
    the fifth radiating patch and the sixth radiating patch are connected to each other and have electric coupling radiation characteristics.

8. The antenna device of claim 1,
    the top-layer metal ground, the first top-layer radiating subunit and the second top-layer radiating subunit are all located on one printed circuit layer of the main board, and
    the bottom-layer metal ground, the first bottom-layer radiating subunit, the second bottom-layer radiating subunit, the first feeding port and the second feeding port are all located on another printed circuit layer of the main board.

9. A signal transmitting method performed by the MIMO antenna device of claim 1, comprising:
    feeding, through two feeding ports of the MIMO antenna device, a radio frequency signal on the main board of the terminal respectively into the first bottom-layer radiating subunit in the first group of antenna radiating units and the second bottom-layer radiating subunit in the second group of antenna radiating units, so that the first bottom-layer radiating subunit and the second bottom-layer radiating subunit excite working currents, and the working currents are coupled into the first top-layer radiating subunit in the first group of antenna radiating units and the second top-layer radiating subunit in the second group of antenna radiating units.

10. The method of claim 9, further comprising:
    the coupled working currents enter a resonant network through a low-frequency radiator in the first top-layer radiating subunit in the first group of antenna radiating units, and then enters a metal ground through a short circuit branch.

11. The method of claim 10, wherein
the low-frequency radiator in the first top-layer radiating subunit has a U-shaped loop or a ring-like loop and has magnetically coupled radiating characteristics.

\* \* \* \* \*